BEST AVAILABLE COPY

DEFENSIVE PUBLICATION T858,016

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 21, 1969

858 O.G. 723

651,683

HEAT SEALABLE HOT MELT COATING COMPOSITIONS

Kenneth W. Hyche, P.O. Box 511, Kingsport, Tenn. 37662

Filed July 7, 1967. Published Jan. 21, 1969

Class 260—28.5

No Drawing. 13 Pages Specification

Heat sealable hot melt coating compositions made from petroleum waxes such as a paraffin wax present in the amount of about 10–80 percent by weight having a melting point of about 130 to 160° F. and maleic-modified polyethylene in the amount of about 2 to 40 percent by weight having a molecular weight of from about 1500 to about 10,000, a density of from about 0.890 to about 0.920, and a saponification number from 2 to 15 combined with copolymers in the amount of 10 to 40 percent by weight selected from ethylene-ethyl-acrylate and ethylene-isobutyl-acrylate, said copolymers having a melt index of from 2 to 250 acrylate and ethylene-isobutyl acrylate. These compositions may be modified with other waxes such as microcrystalline wax, Fischer-Tropsch hydrocarbon waxes and some natural waxes. Also modifying resins such as terpenes, modified terpenes, rosins, rosin esters, hydrocarbons and styrene-modified resins may be added to gain desired characteristics. The compositions may also have incorporated therein slip agents such as oleoamides and antioxidants such as di-lauryl-thio-di-propionate.